United States Patent
Tice et al.

(10) Patent No.: US 8,632,741 B2
(45) Date of Patent: Jan. 21, 2014

(54) EXHAUST CATALYST PRE-HEATING SYSTEM AND METHOD

(75) Inventors: Jon K. Tice, Fort Worth, TX (US); Loran Novacek, Eaton, CO (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/378,084

(22) PCT Filed: Dec. 30, 2010

(86) PCT No.: PCT/US2010/062492
§ 371 (c)(1),
(2), (4) Date: Jan. 24, 2012

(87) PCT Pub. No.: WO2011/084866
PCT Pub. Date: Jul. 14, 2011

(65) Prior Publication Data
US 2013/0047586 A1 Feb. 28, 2013

Related U.S. Application Data

(60) Provisional application No. 61/293,164, filed on Jan. 7, 2010.

(51) Int. Cl.
*F01N 3/20* (2006.01)
*F01N 3/36* (2006.01)

(52) U.S. Cl.
USPC ........ 423/210; 423/245.3; 423/245; 423/247; 423/213.2; 60/299; 60/317; 431/2; 431/5; 110/210; 110/345; 422/105; 700/266; 700/274

(58) Field of Classification Search
USPC .................. 423/210, 245.3, 246, 247, 213.2; 60/299, 317; 431/2, 5; 110/210, 345; 422/105; 700/266, 274
See application file for complete search history.

(56) References Cited

U.S. PATENT DOCUMENTS

| 523,221 A | 7/1894 | Mann |
| 868,358 A | 10/1907 | Noyes |

(Continued)

FOREIGN PATENT DOCUMENTS

| CH | 562 956 A5 * | 6/1975 | ................ F01N 3/10 |
| DE | 809871 | 8/1951 | |

(Continued)

OTHER PUBLICATIONS

Southern Research Institute, Greenhouse Gas (GHG) Verification Guideline Series, "Natural Gas Compressor Leak Mitigation Technologies" Oct. 1999, Research Triangle Park, NC.

(Continued)

*Primary Examiner* — Timothy Vanoy
(74) *Attorney, Agent, or Firm* — Edmonds & Nolte, PC

(57) ABSTRACT

A system and method according to which exhaust is directed from a stationary exhaust source and through a burner, and a combustible fluid is vented from at least one combustible fluid source other than the stationary exhaust source. The combustible fluid is captured and directed to flow from the combustible fluid source and towards the burner, and at least air is mixed with the captured combustible fluid to form a mixture. The mixture is introduced into the burner and burned therein to thereby pre-heat the exhaust flowing therethrough. The pre-heated exhaust contacts a catalyst.

20 Claims, 3 Drawing Sheets

(56) References Cited

U.S. PATENT DOCUMENTS

| | | | |
|---|---|---|---|
| 1,184,609 A | 5/1916 | Birkigt |
| 1,280,787 A | 10/1918 | McCurtain |
| 1,299,156 A | 4/1919 | Fast |
| 1,878,729 A | 9/1932 | Sykes |
| 2,051,886 A | 8/1936 | Neuland |
| 2,169,296 A | 8/1939 | Smith |
| 2,406,388 A | 8/1946 | Larrecq |
| 2,926,755 A | 3/1960 | Kolbe |
| 2,968,190 A | 1/1961 | Orr |
| 3,065,822 A | 11/1962 | McAfee |
| 3,103,176 A | 9/1963 | Lang |
| 3,131,582 A | 5/1964 | Kelbel |
| 3,207,141 A | 9/1965 | Freeman |
| 3,230,796 A | 1/1966 | Thomson |
| 3,257,994 A | 6/1966 | Clements |
| 3,380,555 A | 4/1968 | Myers |
| 3,386,241 A * | 6/1968 | Saufferer ............... 60/274 |
| 3,448,733 A | 6/1969 | Aske |
| 3,583,526 A | 6/1971 | Mulleder |
| 3,664,311 A | 5/1972 | Endo |
| 3,889,464 A * | 6/1975 | Gardner ............... 60/286 |
| 3,924,582 A | 12/1975 | Yagi |
| 3,963,003 A | 6/1976 | Downs |
| 3,967,611 A | 7/1976 | Goto |
| 3,976,039 A | 8/1976 | Henault |
| 4,020,817 A | 5/1977 | Noguchi |
| 4,058,147 A | 11/1977 | Stary |
| 4,148,229 A | 4/1979 | Kuramochi |
| 4,149,495 A | 4/1979 | Miura |
| 4,160,430 A | 7/1979 | Bell |
| 4,177,516 A | 12/1979 | Mason |
| 4,203,395 A | 5/1980 | Cromas |
| 4,270,499 A | 6/1981 | Frelund |
| 4,273,003 A | 6/1981 | Schultz |
| 4,314,534 A | 2/1982 | Nakajima |
| 4,318,376 A | 3/1982 | Nakamura |
| 4,320,728 A | 3/1982 | Artman |
| 4,329,887 A | 5/1982 | Kawamoto |
| 4,350,133 A | 9/1982 | Greiner |
| 4,357,662 A | 11/1982 | Schira |
| 4,359,142 A | 11/1982 | Schultz |
| 4,368,802 A | 1/1983 | Grabill |
| 4,370,106 A | 1/1983 | Lauterbach |
| 4,380,975 A | 4/1983 | Powell |
| 4,381,662 A | 5/1983 | Jiewertz |
| 4,383,507 A | 5/1983 | Powell |
| 4,391,157 A | 7/1983 | Jacklin |
| 4,397,282 A | 8/1983 | Salway |
| 4,418,777 A | 12/1983 | Stockton |
| 4,441,469 A | 4/1984 | Wilke |
| 4,503,824 A | 3/1985 | Ninomiya |
| 4,625,690 A | 12/1986 | Morita |
| 4,667,634 A | 5/1987 | Matsumura |
| 4,708,112 A | 11/1987 | Nanjyo |
| 4,766,863 A | 8/1988 | Fujimori |
| 4,770,135 A | 9/1988 | Jautelat |
| 4,779,595 A | 10/1988 | Fujimori |
| 4,796,592 A | 1/1989 | Hofer |
| 4,807,572 A | 2/1989 | Schlunke |
| 4,809,664 A | 3/1989 | Nakamoto |
| 4,825,833 A | 5/1989 | Ikeura |
| 4,841,935 A | 6/1989 | Yamada |
| 4,858,158 A | 8/1989 | Ishikawa |
| 4,865,001 A | 9/1989 | Jensen |
| 4,913,118 A | 4/1990 | Watanabe |
| 4,926,806 A | 5/1990 | Ahern |
| 4,932,379 A | 6/1990 | Tang |
| 5,003,952 A | 4/1991 | Weglarz |
| 5,038,730 A | 8/1991 | Kashima |
| 5,054,444 A | 10/1991 | Morikawa |
| 5,067,463 A | 11/1991 | Remboski |
| 5,069,183 A | 12/1991 | Nagano |
| 5,086,737 A | 2/1992 | Watanabe |
| 5,103,779 A | 4/1992 | Hare, Sr. |
| 5,111,789 A | 5/1992 | Moriya |
| 5,203,305 A | 4/1993 | Porter |
| 5,224,334 A * | 7/1993 | Bell ............... 60/274 |
| 5,315,961 A | 5/1994 | Wichelhaus |
| 5,315,976 A | 5/1994 | Birk |
| 5,379,592 A | 1/1995 | Waschkuttis |
| 5,497,617 A | 3/1996 | Bagley |
| 5,617,721 A | 4/1997 | Slawson |
| 5,649,515 A | 7/1997 | Fuchs |
| 6,207,120 B1 | 3/2001 | Belmonte |
| 6,298,834 B1 | 10/2001 | Thead |
| 6,321,706 B1 | 11/2001 | Wing |
| 6,393,821 B1 | 5/2002 | Prabhu |
| 6,637,387 B1 | 10/2003 | Gecim |
| 7,044,093 B2 | 5/2006 | Petrie |
| 7,225,998 B2 | 6/2007 | Pellizzari |
| 7,255,136 B2 | 8/2007 | Templet |
| 7,313,916 B2 | 1/2008 | Pellizzari |
| 7,350,514 B2 | 4/2008 | Stoddard |
| 7,503,184 B2 | 3/2009 | Copeland |
| 2005/0000210 A1 | 1/2005 | Smaling et al. |
| 2005/0103289 A1 | 5/2005 | Petrie |
| 2006/0204909 A1 | 9/2006 | Malm |
| 2007/0154854 A1 * | 7/2007 | Liang et al. ............... 431/5 |
| 2008/0127950 A1 | 6/2008 | Malm |
| 2008/0276600 A1 | 11/2008 | Lee et al. |
| 2009/0217649 A1 | 9/2009 | Bremser et al. |

FOREIGN PATENT DOCUMENTS

| | | | |
|---|---|---|---|
| DE | 1034430 | 7/1958 | |
| DE | 1403285 | 12/1959 | |
| DE | 1091818 | 10/1960 | |
| DE | 93906 | 2/1972 | |
| DE | 2646138 | 4/1977 | |
| DE | 2852715 | 6/1980 | |
| DE | 146327 | 2/1981 | |
| DE | 3236586 | 4/1984 | |
| DE | 34 33 015 A1 * | 3/1986 | ............... F01N 3/30 |
| EP | 0 541 922 A2 * | 5/1993 | ............... F01L 1/00 |
| GB | 259222 | 11/1926 | |
| GB | 1102459 | 2/1968 | |
| GB | 2 280 128 A * | 1/1995 | ............... F01N 3/22 |
| JP | 52-68859 A * | 6/1977 | ............... B01D 53/34 |
| JP | 5524279 | 3/1980 | |
| JP | 5635860 | 4/1981 | |
| WO | 2007077919 A1 | 7/2007 | |

OTHER PUBLICATIONS

Spicer / Transmissions "CM-55 Models 5552, 5852, Today's Medium Heavy Standard From the Medium Heavy Leader" Bulletin No. 2258, Dana Corporation 1982; Toledon, Ohio.

Worthington Group McGraw-Edison Company "Efficient Steam Turbine, Turbodyne Steam Turbines" Wellsville, New York.

PCT/US2010/062492 Notification of Transmittal of the International Search Report and the Written Opinion of the International Searching Authority, or the Declaration dated Sep. 23, 2011.

* cited by examiner

EXHAUST CATALYST PRE-HEATING SYSTEM AND METHOD

BACKGROUND

This application claims priority to U.S. Patent Application Ser. No. 61/293,164, which was filed Jan. 7, 2010. The priority application is hereby incorporated by reference in its entirety into the present application.

The present disclosure relates to pre-heating exhaust, such as engine exhaust, before the exhaust flows through a catalyst, and capturing combustible fluids including, for example, volatile organic compounds such as greenhouse gases.

In some applications such as, for example, natural gas applications, one or more exhaust sources, such as engines, and one or more other combustible fluid sources, such as compressors, are operated in proximity to one another. In such applications, combustible fluids from, for example, the compressors and/or other sources, which fluids include volatile organic compounds such as greenhouse gases, are vented to atmosphere and/or flared. However, such venting and/or flaring emits greenhouse gases and/or wastes energy. Also, exhaust from the engines or other sources, is sometimes directed through a catalyst before flowing to atmosphere, thereby reducing the respective amounts of pollutants present in the exhaust upon entry to atmosphere. The exhaust is pre-heated upstream of the catalyst to ensure and/or improve the catalytic activity of the catalyst. However, such pre-heating typically requires electrical power to electrically heat the exhaust, and/or fuel to operate a burner that heats the exhaust, thus increasing cost and energy requirements.

Therefore, what is needed is a method, system or apparatus that overcomes one or more of the above-described problems or drawbacks.

SUMMARY OF THE INVENTION

Embodiments of the present disclosure may provide a method of processing exhaust. The method may include directing the exhaust from a stationary exhaust source and through a burner, and venting a combustible fluid from a combustible fluid source other than the stationary exhaust source. The exemplary method may also include capturing and directing the combustible fluid so that the captured combustible fluid flows from the combustible fluid source and towards the burner, and mixing air with the captured combustible fluid to form a mixture; introducing the mixture into the burner. The method may further include burning the mixture in the burner to thereby pre-heat the exhaust flowing therethrough, and contacting the pre-heated exhaust with a catalyst.

Embodiments of the present disclosure may further provide a system for processing exhaust. The exemplary system may include a stationary exhaust source, an exhaust stack in fluid communication with the stationary exhaust source, and a catalyst in fluid communication with the stationary exhaust source through the exhaust stack. The system may also include a burner disposed in the exhaust stack between the stationary exhaust source and the catalyst, the burner being in fluid communication with each of the stationary exhaust source and the catalyst. The system may further include a fuel mixer in fluid communication with the burner, an air source in fluid communication with the fuel mixer, and a source of combustible fluid other than the exhaust source, the source of combustible fluid being in fluid communication with the fuel mixer.

Embodiments of the present disclosure may further provide an apparatus for controlling the pre-heating of exhaust from an exhaust source before the exhaust flows through a catalyst. The exemplary apparatus may include a computer readable medium having a plurality of instructions stored therein and executable by a processor. The plurality of instructions may include instructions that control the flow of captured combustible fluid that is vented and captured from at least one combustible fluid source other than the exhaust source, the captured combustible fluid flowing from the at least one combustible fluid source to a burner through which the exhaust flows before flowing through the catalyst. The instructions may also control the flow of air into the flow of the captured combustible fluid, and control the ignition of a mixture in the burner, the mixture including the captured combustible fluid and the air, the ignition of the mixture in the burner causing the mixture to burn and thus pre-heat the exhaust that flows through the burner before the exhaust flows through the catalyst.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
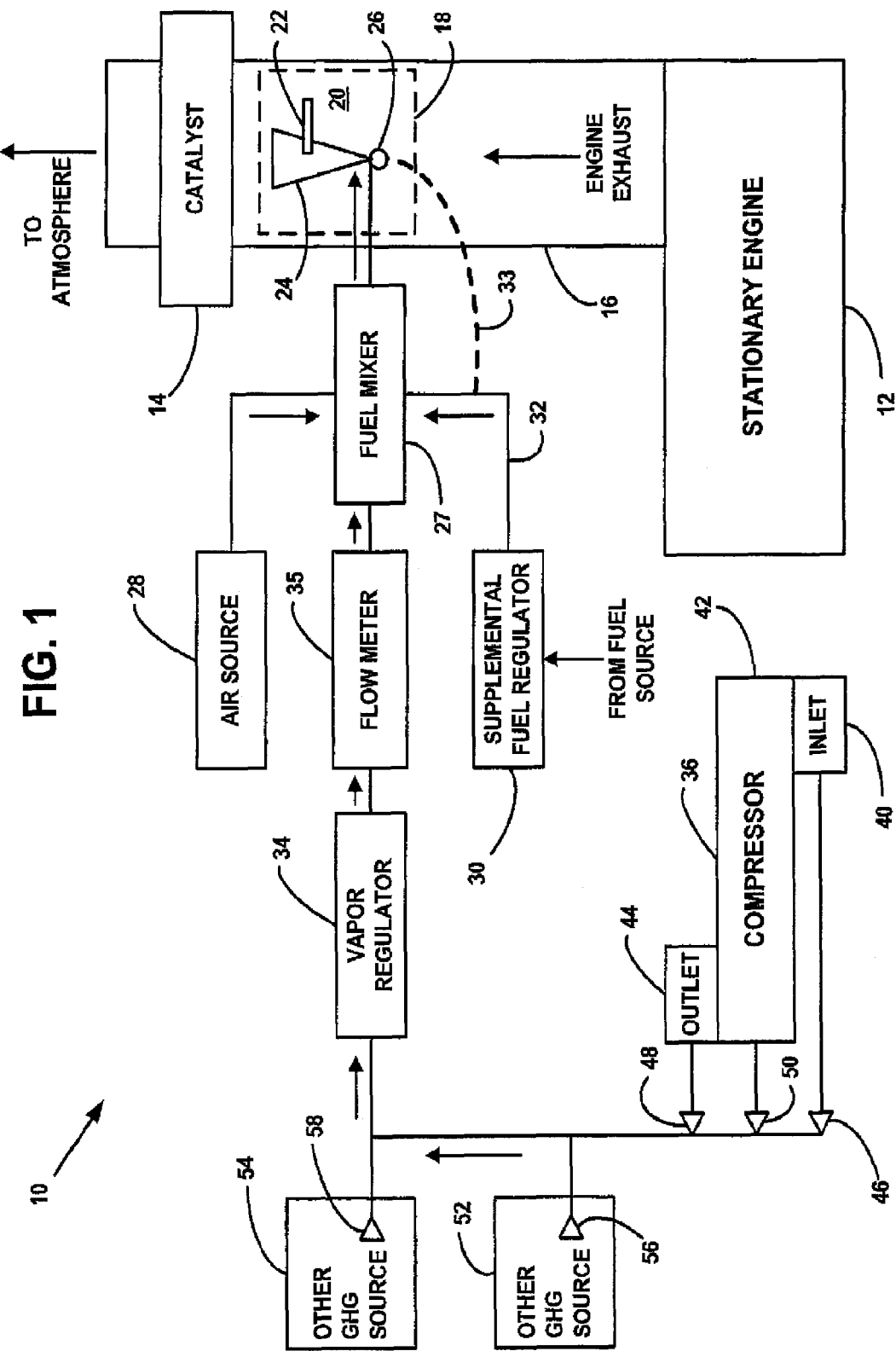
FIG. 1 is a diagrammatic view of a system for processing exhaust, according to an exemplary embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Also, the use of the term "or" in the specification or the claims is intended to be non-inclusive, and can refer to either embodiment disclosed or contemplated herein.

In an exemplary embodiment, as illustrated in FIG. 1, a system is generally referred to by the reference numeral 10 and includes a stationary exhaust source 12, such as a stationary engine, and a catalyst 14 in fluid communication therewith. The catalyst 14 includes a catalyst bed and may vent to atmosphere. An exhaust stack 16 extends from the stationary exhaust source 12 to the catalyst 14 so that the catalyst 14 is in fluid communication with the stationary exhaust source 12 through the exhaust stack 16. A burner 18 can be in fluid communication with the exhaust stack 16. In at least one embodiment, the burner 18 may be positioned or otherwise disposed within the exhaust stack 16 between the stationary exhaust source 12 and the catalyst 14. In an exemplary embodiment, the stationary exhaust source 12 may not be readily movable and may form part of, for example, a fixed power plant installation at a facility such as an oil rig or a natural gas processing station. In several exemplary embodiments, the stationary exhaust source 12 may include, or may form part of, a turbo-compression diesel engine, a reciprocating internal combustion engine (RICE), another type of engine, for example, another type of gasoline engine, and/or any combination thereof.

The burner 18 may define a flow region 20 that is in fluid communication with each of the stationary exhaust source 12 and the catalyst 14. The burner 18 may include an igniter 22, a diffuser 24, and a pilot fuel source 26, all of which may be at least partially positioned within the flow region 20. In an exemplary embodiment, the flow region 20 of the burner 18 may be at least partially defined by the exhaust stack 16.

A fuel mixer 27 may be in fluid communication with the flow region 20 of the burner 18, and an air source 28 may be in fluid communication with the fuel mixer 27. In an exemplary embodiment, the air source 28 may include, or may form part of, an air supply, a compressed air supply, a blower, an engine driven or electrical air pump, another type of air pump, another type of air source that is configured to supply pressurized air to the fuel mixer 27, and/or any combination thereof.

A supplemental fuel regulator 30 may be in fluid communication with the fuel mixer 27 through a supplemental fuel flow line 32, which, in turn, may be in fluid communication with the pilot fuel source 26 through a pilot fuel flow line 33. The supplemental fuel regulator 30 may also be in fluid communication with a fuel source (not shown), which may be the same as, or different from, the fuel source that supplies fuel to the stationary exhaust source 12. The supplemental fuel regulator 30 may be a control valve, a diaphragm-type valve with a spring control, a pressure balanced operating valve, and/or any combination thereof. In an exemplary embodiment, the supplemental fuel regulator 30 may be manually or electronically controlled.

A vapor regulator 34 may be in fluid communication with the fuel mixer 27. In an exemplary embodiment, the vapor regulator 34 can be a gas regulator, as is known in the art. The vapor regulator 34 may be a control valve, a diaphragm-type valve with a spring control, a pressure balanced operating valve, and/or any combination thereof. In an exemplary embodiment, the vapor regulator 34 may be manually or electronically controlled. A flow meter 35 may be in fluid communication with each of the vapor regulator 34 and the fuel mixer 27, and may be positioned therebetween.

The system 10 can further include a source of combustible fluid that leaks or otherwise vents combustible fluid therefrom during its operation such as, for example, a compressor 36. The compressor 36 may include an inlet nozzle 40, a casing 42 and an outlet nozzle 44. Vents 46 and 48 may be coupled to the inlet nozzle 40 and the outlet nozzle 44, respectively. In at least one embodiment, another vent 50 may also be coupled to the casing 42. Each of the vents 46, 48 and 50 may be in fluid communication with the vapor/gas regulator 34. In an exemplary embodiment, the compressor 36 may include a two-throw compressor, a four-throw compressor, or another type of compressor.

The vents 46, 48 and 50 may each include a fixed orifice and/or a variable orifice, and may be configured to capture and direct combustible fluids such as, for example, fugitive or vented emissions including combustible fluids such as, for example, volatile organic compounds (VOCs), which are traditionally vented to atmosphere. In several exemplary embodiments, these VOCs may be organic chemical compounds that have high enough vapor pressures under normal conditions to significantly vaporize and enter the atmosphere. In several exemplary embodiments, these VOCs may be or include greenhouse gases (GHGs). In several exemplary embodiments, these GHGs may be gases that absorb and emit radiation within the thermal infrared range when the gases are in the atmosphere. In an exemplary embodiment, the vents 46, 48 and 50 may be configured to capture and direct fugitive or vented GHGs from the inlet nozzle 40, the outlet nozzle 44, and the casing 42, respectively.

Instead of, or in addition to the compressor 36, the system 10 may further include one or more other sources of combustible fluids that leak or otherwise vent combustible fluids therefrom during their operation such as, for example, one or more additional compressors and/or other types machines and/or equipment. In FIG. 1, these other sources of combustible fluids are referred to as GHG sources 52 and 54. Vents 56 and 58 can be coupled to the GHG sources 52 and 54, respectively. Each of the vents 56 and 58 may be in fluid communication with the fuel mixer 27, and may include a fixed orifice and/or a variable orifice. In an exemplary embodiment, the vents 56 and 58 may be configured to capture and direct combustible fluids such as, for example, fugitive or vented GHGs, from the GHG sources 52 and 54, respectively, which GHGs are traditionally vented to atmosphere. In an exemplary embodiment, instead of, or in addition to GHGs, the vents 56 and 58 may be configured to capture and direct other combustible fluids such as, for example, fugitive or vented emissions including, for example, other types of volatile organic compounds (VOCs), which are traditionally vented to atmosphere.

In exemplary operation of the compressor 36, GHG emissions may be leaked or otherwise vented through the one or more vents 46, 48 and 50. Similarly, as a result of the operation of the other GHG sources 52 and 54, GHG emissions may be leaked or otherwise vented through vents 56 and 58. Since the vents 46, 48, 50, 56 and 58 may all be in fluid communication with the burner 18, the GHG emissions vented through the vents 46, 48, 50, 56 and 58 may be entrained and directed through the vapor regulator 34, through the flow meter 35, through the fuel mixer 27, and to the burner 18. In several exemplary embodiments, the GHG emissions may be unintentionally vented from the compressor 36 and the other GHG sources 52 and 54 by, for example, leaking out from the compressor 36 and the other GHG sources 52 and 54, and/or the GHG emissions may be intentionally vented.

The vapor regulator 34 may control the flow of captured GHG emissions to the burner 18, entraining and/or homogenizing the captured GHG emissions. The vapor regulator 34 may be adjusted either manually or by an electronic controller in order to avoid over-capture of GHG emissions from the vents 46, 48, 50, 56 and 58, which over-capture may lead to over-saturation of GHG in a mixture to be formed in the fuel mixer 27. In an exemplary embodiment, if the vapor regulator 34 includes an electronic controller, the electronic controller may adjust the vapor regulator 34 in response to changes in the composition of the captured emissions in order to optimize GHG capture. The flow meter 35 may be adapted to measure the rate of the flow of the captured GHG emissions. In an exemplary embodiment, the flow meter 35 may be in communication with the vapor regulator 34, which may adjust or otherwise control the flow of the captured GHG emissions in response to flow rate measurements by the flow meter 35.

During the flow of the captured GHG emissions to the burner 18, the air source 28 can supply air to the fuel mixer 27 and thus into the flow of the captured GHG emissions. Moreover, supplemental fuel may be directed to flow into the fuel mixer 27 and thus into the flow of the captured GHG emissions. For example, the supplemental fuel may flow through the supplemental fuel regulator 30, through the supplemental fuel flow line 32, and into the fuel mixer 27. The supplemental fuel regulator 30 can control the flow of the supplemental fuel, and may be adjusted either manually or by an electronic controller. The fuel mixer 27 may be configured to blend and mix at least the captured GHG emissions, air, and supplemental fuel to form a mixture thereof, which flows from the fuel mixer 27 into the flow region 20 of the burner 18. The igniter 22 of the burner 18 can be configured to ignite the mixture in the flow region 20 so that the mixture is burned by the burner 18. By burning the mixture, the carbon footprint of the system 10 may be reduced. That is, the amount of GHGs emitted to atmosphere as a result of the operation of the compressor 36 and the other GHG sources 52 and 54 may be reduced.

If necessary, to ignite and/or burn the mixture in the flow region 20, pilot fuel may be provided to the burner 18 through the supplemental fuel flow line 32, the pilot fuel flow line 33, and the pilot fuel source 26.

Before and/or during burning the mixture with the burner 18, the stationary exhaust source 12 may be operated and, as a result, exhaust may flow from the stationary exhaust source 12 to the catalyst 14 through the exhaust stack 16. The exhaust contacts and flows through the catalyst 14 and to atmosphere. By directing the exhaust to contact and flow through the catalyst 14, the respective amounts of pollutants present in the exhaust upon entry to atmosphere such as, for example, carbon monoxide (CO) and/or formaldehyde (CHOH), are reduced. Before the exhaust enters the catalyst 14, however, the exhaust may be pre-heated by flowing through the flow region 20 in which the mixture formed in the fuel mixer 27 is being burned by the burner 18. This pre-heating ensures and/or improves the catalytic activity of the catalyst 14. By adding thermal energy to the exhaust in the flow region 20 of the burner 18, the thermal requirements for effective operation of the catalyst 14 can be augmented, and the overall VOC and CO destruction/conversion rate across the catalyst 14 may be improved.

In view of the foregoing, in one or more embodiments, the system 10 uses energy such as GHG emissions otherwise customarily vented to atmosphere or flared to provide the useful effect of adding heat to the catalyst 14. The system 10 may be operated in the foregoing manner in order to provide pre-heating of any exhaust under all conditions of the stationary exhaust source 12 including, for example, startup, malfunction, normal operation, low exhaust temperature running conditions, varying load/speed conditions, etc.

In several exemplary embodiments, additional thermal energy may be added to the exhaust before the exhaust flows into the catalyst 14, that is, the exhaust may be further pre-heated, upstream or downstream of the burner 18.

In an exemplary embodiment, during the operation of the system 10, the amount of the reduction of GHG emissions to atmosphere may be determined by determining the composition of the captured GHG emissions, determining a GHG equivalent of the composition of the captured GHG emissions, and measuring the rate of the flow of the GHG emissions with the flow meter 35. The amount of the reduction may then be reported to, for example, the operator of the system 10 and/or a government entity. For example, the composition of the captured GHG emissions may be determined to be 100% or nearly 100% methane, and the GHG equivalent of 1 unit of 100% or nearly 100% methane is determined to be about 21 units of carbon dioxide. GHG equivalents may be determined from a variety of sources such as, for example, the U.S. Environmental Protection Agency's Greenhouse Gas Equivalencies Calculator, which is available on the word wide web at the following web address: http://www.epa.gov/RDEE/energy-resources/calculator.html. In view of this GHG equivalent, the operation of the system 10 results in a 20× (21−1=20) reduction in GHG emissions to atmosphere. Therefore, if 1 lb/hour of methane flow is measured by the flow meter 35 over a 24 hour time period, the amount of the reduction of GHG emissions to atmosphere is determined to be 480 lbs of carbon dioxide ([1 lb/hour×24 hours×21]−[1 lb/hour×24 hours×1]=480 lbs). This 480 lb-reduction is then reported to, for example, the operator of the system 10 and/or a government entity.

Figure 2:
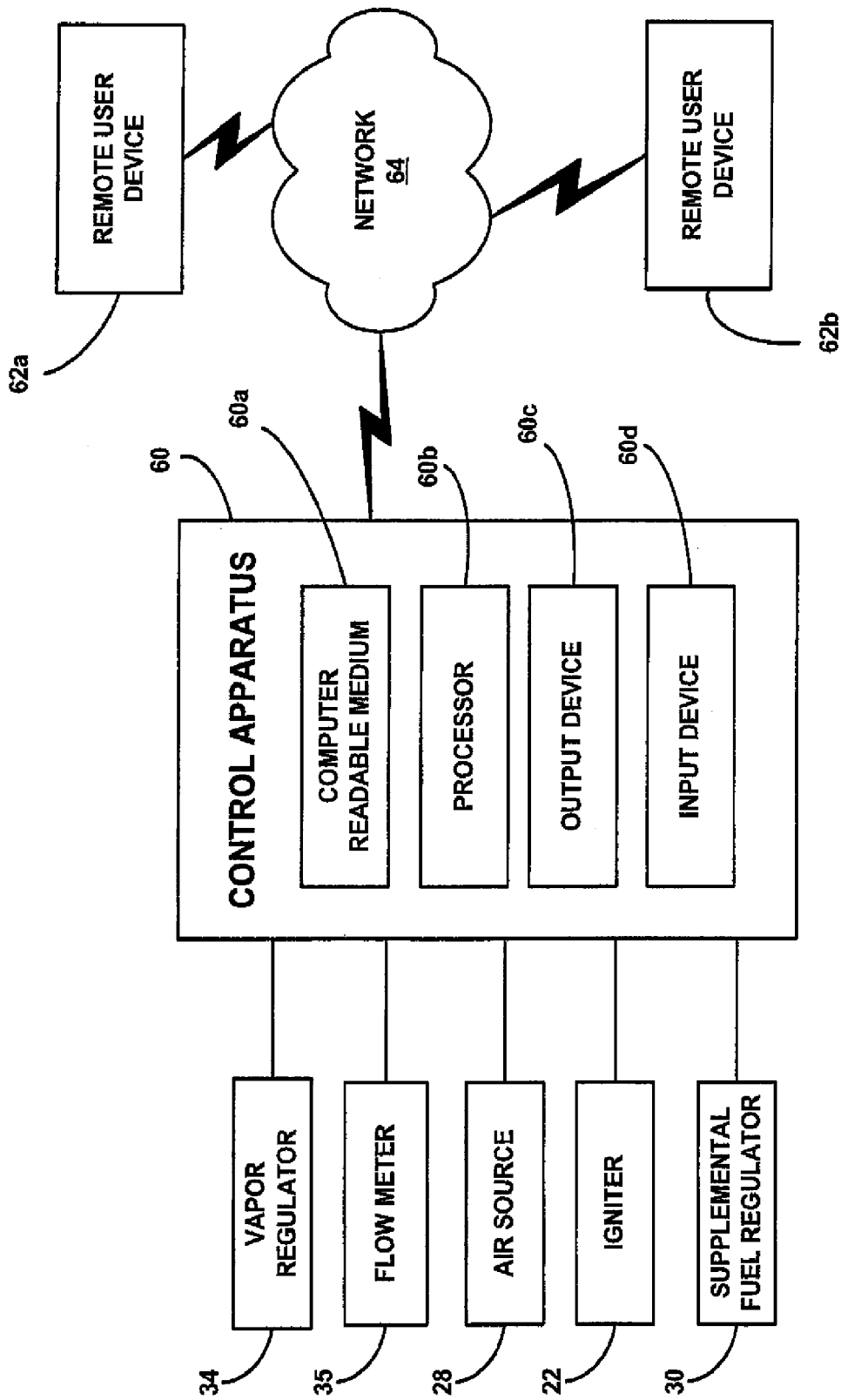
FIG. 2 is a diagrammatic view of another portion of the system of FIG. 1, according to an exemplary embodiment.

In an exemplary embodiment, as illustrated in FIG. 2 with continuing reference to FIG. 1, the system 10 may include a control apparatus 60 in communication with each of the vapor regulator 34, the flow meter 35, the air source 28, the igniter 22 and the supplemental fuel regulator 30. The control apparatus 60 may be configured to send control signals and/or data to one or more of the vapor regulator 34, the flow meter 35, the air source 28, the igniter 22 and the supplemental fuel regulator 30, and may be configured to receive, convert, condition and/or process signals and/or data transmitted thereto by one or more of the vapor regulator 34, the flow meter 35, the air source 28, the igniter 22 and the supplemental fuel regulator 30.

The control apparatus 60 can include a computer readable medium 60a, a processor 60b, an output device 60c, and an input device 60d. Instructions accessible to, and executable by, the processor 60b may be stored in the computer readable medium 60a. The computer readable medium 60a may include one or more databases and/or one or more data structures stored therein. The processor 60b may include, for example, one or more of the following: a programmable general purpose controller, an application specific integrated circuit (ASIC), other controller devices, and/or any combination thereof. The output device 60c may include a graphical display, which, in several exemplary embodiments, may be in the form of, or include, one or more digital displays, one or more liquid crystal displays, one or more cathode ray tube monitors, and/or any combination thereof. The output device 60c may include a graphical display, a printer, a plotter, and/or any combination thereof. The input device 60d may include a touch screen, which, in several exemplary embodiments, is, includes or is part of the output device 60c. Instead of, or in addition to a touch screen, the input device 60d may include one or more keyboards, one or more PIN pads, one or more scanners, one or more card readers, and/or any combination thereof. In several exemplary embodiments, the control apparatus 60 may include, or can be part of, a telephone, a personal computer, a portable computer, a personal digital assistant, a cellular telephone, other types of telecommunications devices, other types of computing devices, and/or any combination thereof.

Remote user devices 62a and 62b may be in communication with the control apparatus 60 via a network 64. Each of the remote user devices 62a and 62b may be a telephone, a personal computer, a portable computer, a personal digital assistant, a cellular telephone, other types of telecommunications devices, other types of computing devices, and/or any combination thereof. The network 64 may include the Internet, one or more local area networks, one or more wide area networks, one or more cellular networks, one or more wireless networks, one or more voice networks, one or more data networks, one or more communication systems, and/or any combination thereof.

During the above-described operation of the system 10, in an exemplary embodiment, the control apparatus 60 may control the vapor regulator 34 to thereby control the flow of the GHG emissions to the burner 18, the air source 28 to thereby control the flow of the air into the flow of the GHG emissions, the supplemental fuel regulator 30 to thereby control the flow of the supplemental fuel into the flow of GHG emissions, the igniter 22 to thereby control the ignition of the mixture formed in the fuel mixer 27, and the flow meter 35 to thereby control the measurement of the rate of the flow of GHG emissions. In an exemplary embodiment, the processor 60b may execute at least the following instructions stored in the computer readable medium 60a: instructions that control the vapor regulator 34 to thereby control the flow of the GHG emissions to the burner 18, instructions that control the air source 28 to thereby control the flow of the air into the flow of the GHG emissions, instructions that control the igniter 22 to thereby control the ignition of the mixture formed in the fuel mixer 27, and instructions that control the supplemental fuel regulator 30 to thereby control the flow of supplemental fuel into the flow of GHG emissions.

Further, the processor 60b may execute instructions stored in the computer readable medium 60a that automatically determine the amount of the reduction of GHG emissions to atmosphere, which include instructions that control the flow meter 35 to automatically measure the rate of the flow of the GHG emissions to the burner 18. In an exemplary embodiment, the instructions that automatically determine the amount of the reduction of GHG emissions to atmosphere may include instructions for controlling different analysis equipment at, for example, the vents 46, 48, 50, 56 and 58 which analyze the captured GHG emissions to thereby determine the composition of the GHG emissions. The instructions that automatically determine the amount of the reduction of GHG emissions to atmosphere may also include instructions that determine the GHG equivalent of the captured GHG emissions, which, in turn, may include instructions for looking up GHG equivalents stored in a database that itself is stored in the computer readable medium 60a, and/or instructions that access GHG equivalents at a remote website or database via the network 64.

Still further, the processor 60b may execute instructions stored in the computer readable medium 60a that automatically report the amount of the reduction of GHG emissions to atmosphere by, for example, automatically outputting the amount of the reduction to the output device 60c.

During the above-described operation of the system 10, in an exemplary embodiment, the control apparatus 60 and its operation may be remotely monitored and/or controlled with one or both of the remote user devices 62a and 62b via the network 64, and the amount of the reduction of GHG emissions may be reported by outputting the amount to one or both of the remote user devices 62a and 62b, in addition to or instead of the output device 60c. More particularly, in an exemplary embodiment, one or more of the vapor regulator 34, the flow meter 35, the air source 28, the igniter 22 and the supplemental fuel regulator 30 may transmit signals corresponding to operational parameters of the system 10 to the control apparatus 60, which, in turn, converts, conditions or otherwise processes the transmitted signals. The control apparatus 60 may send, via the network 64, data corresponding to the processed signals to the remote user devices 62a and 62b, with which the data may be reviewed, thereby permitting the remote monitoring of the system 10 and its operation. Moreover, one or both of the remote user devices 62a and 62b may send, via the network 64 and the control apparatus 60, control instructions and/or data to one or more of the vapor regulator 34, the flow meter 35, the air source 28, the igniter 22 and the supplemental fuel regulator 30, and/or vice versa, thereby permitting the remote control and monitoring of the system 10 and its operation, and the remote reporting of the amount of the reduction of GHG emissions to atmosphere.

Figure 3:
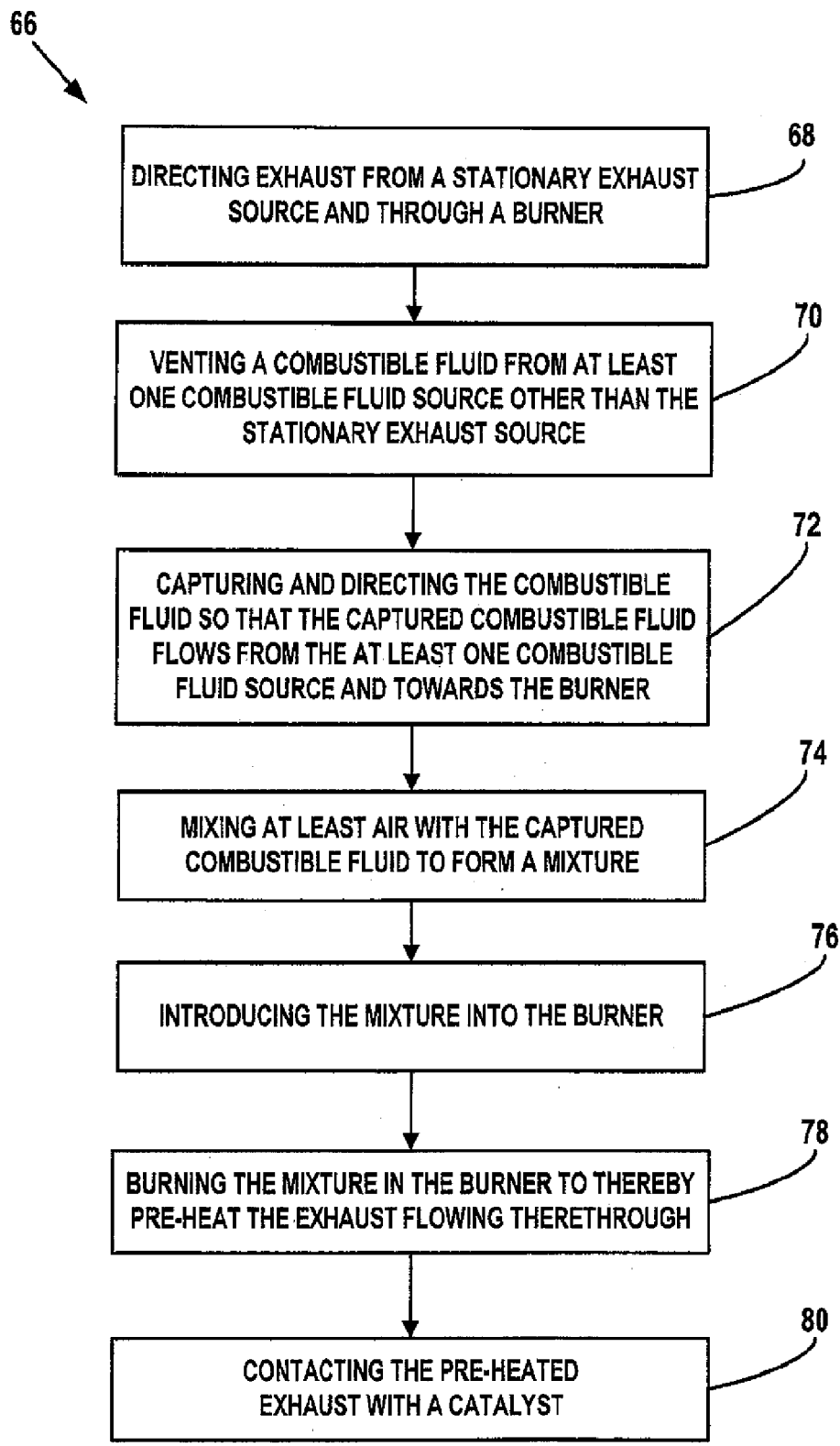
FIG. 3 is a flow chart illustration of a method of processing exhaust, according to an exemplary embodiment.

In an exemplary embodiment, as illustrated in FIG. 3 with continuing reference to FIGS. 1 and 2, a method of processing exhaust is generally referred to by the reference numeral 66 and includes directing the exhaust from a stationary exhaust source and through a burner, as at block 68. A combustible fluid may then be vented from at least one combustible fluid source other than the stationary exhaust source, as at block 70. The combustible fluid can be captured and directed from the at least one combustible fluid source and towards the burner, as at block 72. The captured combustible fluid can then be mixed with at least air to form a mixture, as at block 74, and then introduced into the burner, as at block 76. The burner may be configured burn the mixture as a pre-heater of the exhaust flowing therethrough, as at block 78. The pre-heated exhaust may then be put in contact with a catalyst, as at block 80, to provide added heat to the system.

Although the present disclosure has described embodiments relating to specific environments, it is understood that the apparatus, systems and methods described herein could be applied to other environments. The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of processing exhaust, comprising:
   introducing the exhaust from a stationary exhaust source to a burner;
   capturing a combustible fluid from a combustible fluid source other than the stationary exhaust source;
   mixing air with the captured combustible fluid to form a mixture;
   burning the mixture in the burner to pre-heat the exhaust flowing therethrough; and
   contacting the pre-heated exhaust with a catalyst.

2. The method of claim 1, wherein the captured combustible fluid comprises one or more combustible or volatile organic compounds.

3. The method of claim 1, further comprising:
   determining an amount of reduction of greenhouse gas emissions to atmosphere; and
   outputting the amount of the reduction of greenhouse gas emissions to atmosphere.

4. The method of claim 3, wherein determining the amount of the reduction of greenhouse gas emissions to atmosphere comprises:
   determining a composition of the captured combustible fluid;
   determining a greenhouse gas equivalent of the composition of the captured combustible fluid; and
   measuring a rate of flow of the captured combustible fluid toward the burner before mixing air therewith.

5. The method of claim 4, wherein determining the amount of the reduction of greenhouse gas emissions to atmosphere further comprises:
   executing a plurality of instructions with a processor, the plurality of instructions being stored in a computer readable medium that is operably coupled to the processor, wherein, in response to the execution of the plurality of instructions:
   the rate of the flow of the captured combustible fluid is automatically measured;
   an amount of the reduction of greenhouse gas emissions to atmosphere is automatically determined using at least the determined composition of the captured combustible fluid, the determined greenhouse gas equivalent of the captured combustible fluid, and the automatically measured rate of the flow of the captured combustible fluid; and
   the amount of the reduction of greenhouse gas emissions to atmosphere is automatically reported.

6. The method of claim 1, further comprising mixing supplemental fuel with the air and the captured combustible fluid.

7. The method of claim 6, further comprising controlling a flow of the supplemental fuel into the flow of the captured combustible fluid.

8. The method of claim 1, further comprising:
   providing pilot fuel to the burner.

9. The method of claim 1, wherein burning the mixture in the burner comprises:
   igniting the mixture; and
   controlling the ignition of the mixture.

10. A system for processing exhaust, comprising:
    a stationary exhaust source;
    an exhaust stack in fluid communication with the stationary exhaust source;
    a catalyst in fluid communication with the stationary exhaust source through the exhaust stack;
    a burner in fluid communication with the exhaust stack between the stationary exhaust source and the catalyst, the burner being in fluid communication with each of the stationary exhaust source and the catalyst;
    a fuel mixer in fluid communication with the burner;
    an air source in fluid communication with the fuel mixer; and
    a source of combustible fluid other than the exhaust source, in fluid communication with the fuel mixer.

11. The system of claim 10, wherein the combustible fluid comprises one or more combustible or volatile organic compounds.

12. The system of claim 10, further comprising a gas or vapor regulator in fluid communication with each of the fuel mixer and the source of combustible fluid, the gas or vapor regulator being positioned between the fuel mixer and the source of combustible fluid.

13. The system of claim 12, further comprising a flow meter in fluid communication with each of the gas or vapor regulator and the fuel mixer, the flow meter being positioned between the gas or vapor regulator and the fuel mixer.

14. The system of claim 10, further comprising a supplemental fuel regulator in fluid communication with the fuel mixer.

15. The system of claim 10, further comprising a control apparatus, comprising:
    a processor; and
    a computer readable medium coupled to the processor and having a plurality of instructions stored therein that are executable by the processor, the plurality of instructions being operable to control a flow of the combustible fluid from the source of combustible fluid to the fuel mixer, control a flow of air from the air source to the fuel mixer, and control ignition of the mixture by the burner.

16. An apparatus for controlling pre-heating of exhaust from a stationary exhaust source before the exhaust flows through a catalyst, the apparatus comprising:
    a computer readable medium having a plurality of instructions stored therein, the plurality of instructions being executable by a processor, the plurality of instructions comprising:
    instructions that control a flow of captured combustible fluid that is vented and captured from at least one combustible fluid source other than the stationary exhaust source, the captured combustible fluid flowing from the at least one combustible fluid source to a burner through which the exhaust flows before the exhaust flows through the catalyst;
    instructions that control a flow of air into the flow of the captured combustible fluid; and
    instructions that control ignition of a mixture in the burner, the mixture comprising the captured combustible fluid and the air, the ignition of the mixture in the burner causing the mixture to burn and thus pre-heat the exhaust that flows through the burner before the exhaust flows through the catalyst.

17. The apparatus of claim 16, wherein the plurality of instructions further comprises instructions that control a flow of supplemental fuel into the flow of the captured combustible fluid, wherein the mixture further comprises the supplemental fuel.

18. The apparatus of claim 16, wherein the captured combustible fluid comprises one or more greenhouse gases and burning the mixture reduces greenhouse gas emissions to atmosphere, wherein the plurality of instructions further comprises:
    instructions that automatically determine an amount of the reduction of greenhouse gas emissions to atmosphere; and instructions that automatically report the amount of the reduction of greenhouse gas emissions to atmosphere.

19. The apparatus of claim 18, wherein the instructions that automatically determine the amount of the reduction of greenhouse gas emissions to atmosphere comprise instructions that automatically measure a rate of the flow of the captured combustible fluid towards the burner before the air flows into the flow of the captured combustible fluid.

20. The apparatus of claim 19, wherein the amount of the reduction of greenhouse gas emissions to atmosphere is automatically determined using at least a determined composition of the captured combustible fluid, a determined greenhouse gas equivalent of the captured combustible fluid, and the automatically measured rate of the flow of the captured combustible fluid.

* * * * *